US00RE36971E

United States Patent [19]

Stokoe et al.

[11] E Patent Number: Re. 36,971

[45] Reissued Date of Patent: Nov. 28, 2000

[54] METHOD OF DETERMINING AND ANALYZING A SHIP'S WEIGHT

[75] Inventors: Geoffrey Atrill Stokoe; George Montague Green, both of Miami; Iver Duane Cayocca, Coral Gables, all of Fla.

[73] Assignee: Syncrolift, Inc., Miami, Fla.

[21] Appl. No.: 09/198,331

[22] Filed: Nov. 24, 1998

Related U.S. Patent Documents

Reissue of:

[64] Patent No.: 5,178,488
Issued: Jan. 12, 1993
Appl. No.: 07/716,966
Filed: Jun. 18, 1991

[51] Int. Cl.[7] ..... B63C 3/06

[52] U.S. Cl. ..... 405/3; 114/48; 405/4; 414/678

[58] Field of Search ..... 405/1–7; 114/44–48; 52/125.1; 414/678; 254/89 R

[56] References Cited

U.S. PATENT DOCUMENTS

| | | | |
|---|---|---|---|
| 3,073,125 | 1/1963 | Pearlson | 405/3 |
| 3,327,997 | 6/1967 | Zenke | 254/89 R |
| 3,429,288 | 2/1969 | Suir | 405/3 X |
| 3,777,691 | 12/1973 | Beale . | |
| 3,916,811 | 11/1975 | Fromnick et al. | 405/4 X |
| 4,053,138 | 10/1977 | Mattson . | |
| 4,087,979 | 5/1978 | Pearlson | 405/3 |
| 4,329,082 | 5/1982 | Gillis . | |
| 4,686,920 | 8/1987 | Thomas . | |
| 4,763,592 | 8/1988 | Russ . | |
| 5,020,463 | 6/1991 | Franklin . | |
| 5,051,027 | 9/1991 | Horton . | |

FOREIGN PATENT DOCUMENTS

| | | |
|---|---|---|
| 82677 | 6/1983 | European Pat. Off. . |
| 2132142 | 1/1973 | Germany . |
| 3629244 | 3/1987 | Germany . |
| 58-36998 | 3/1983 | Japan . |
| 468833 | 12/1975 | U.S.S.R. . |

OTHER PUBLICATIONS

Letter, May 1, 1986 from Hydraudyne Systems & Engineering B.V. to a Mr. Michael Pomeroy (14 pages).
Letter, May 23, 1989 from Hydraudyne Systems & Engineering B.V. to a Mr. Michael Pomeroy (17 pages).
Hydraudyne Document Dated Apr. 12, 1989 (4 pages).
Excerpt, Luzon Shiplift Manual, undated (1 page).

*Primary Examiner*—Dennis L. Taylor
*Attorney, Agent, or Firm*—Pillsbury Madison & Sutro LLP

[57] ABSTRACT

A method of assessing a ships weight so as to e.g. assist in its design and development, or to ascertain its actual center of gravity or its loaded state, comprises positioning the ship on a dry dock platform made up of a number of articulatedly joined sub platforms connected for lifting and lowerng by hoist winches. The hoist winches include signal devices which signal the load each is supporting, to a computer and visual display unit which displays the loads. The computer computes e.g. the center of gravity or the ships weight, in the displacement of the center of gravity from its designed position, the information then being passed to the designer.

2 Claims, 5 Drawing Sheets

METHOD OF DETERMINING AND ANALYZING A SHIP'S WEIGHT

Matter enclosed in heavy brackets [ ] appears in the original patent but forms no part of this reissue specification; matter printed in italics indicates the additions made by reissue.

FIELD OF THE INVENTION

The present invention relates to a method of weighing a ship and analysing the weight distribution thereof. The invention has particular efficacy in the field of dry docking marine vessels and is described in detail herein in that context. However, the invention is applicable to a wide range of loads if they are placed on similar lifting devices and consequently should not be regarded as being limited in application merely by virtue of the specific description herein.

DESCRIPTION OF THE PRIOR ART

In U.S. Pat. No. 3,073,125 now expired, there is disclosed and claimed a dry dock which for operation was placed under a ship which lay between two quays, and was then raised by hoist winches on the quays, along with the ship, to a height which brought the ship to quay level. The dry dock included rail mounted trolleys by means of which the ship could be moved onto the quay.

U.S. Pat. No. 4,087,979 also owned by the same assignee as this invention and still in force, discloses and claims improvements to the dry dock of U.S. Pat. No. 3,073,125, inter alia by way of enabling construction in module form off site, and articulating the structure at positions along its length. There are a total of one hundred and sixty eight such dry docks in operation in sixty two countries.

Both types of dry dock are operated by hoist winches which in turn are driven by a.c. synchronous motors, so as to ensure lift synchronism. Control is computerised and includes manual override.

SUMMARY OF THE INVENTION

It is an object of the present invention to provide a mode of operation of a dry dock of the kind disclosed and claimed in the aforementioned patents and which should be regarded as being incorporated herein by virtue of this reference thereto, which mode of operation enables the extraction of information from the apparatus which further enables design modification and/or working of a ship.

A further object of the present invention is to provide a mode of operation which enables the weight of a ship being lifted, to be observed.

A further object of the present invention is to provide a mode of operation which enables the ships centre of gravity to be ascertained.

A still further object of the present invention is to provide an indication of the ships weight distribution.

The invention utilises the output from hoist load indicating means in the load path of each hoist winch, in a system of hoist winches on opposing quays.

The load indicating means is of the kind which generates electrical signals when acted on by a said load.

Means are provided which receive and condition the signals and further means are provided which receive the conditioned signals and use them to react upon the system and thereby control it.

The further means also uses said signals to generate visual displays of load magnitudes, current magnitudes, weight distributions and total weights of gross lifted load and/or of the ship itself, as experienced by the hoist winches.

BRIEF DESCRIPTION OF THE DRAWINGS

The invention will now be described, by way of example and with reference to the accompanying drawings in which.

DETAILED DESCRIPTION OF THE INVENTION

Figure 1:
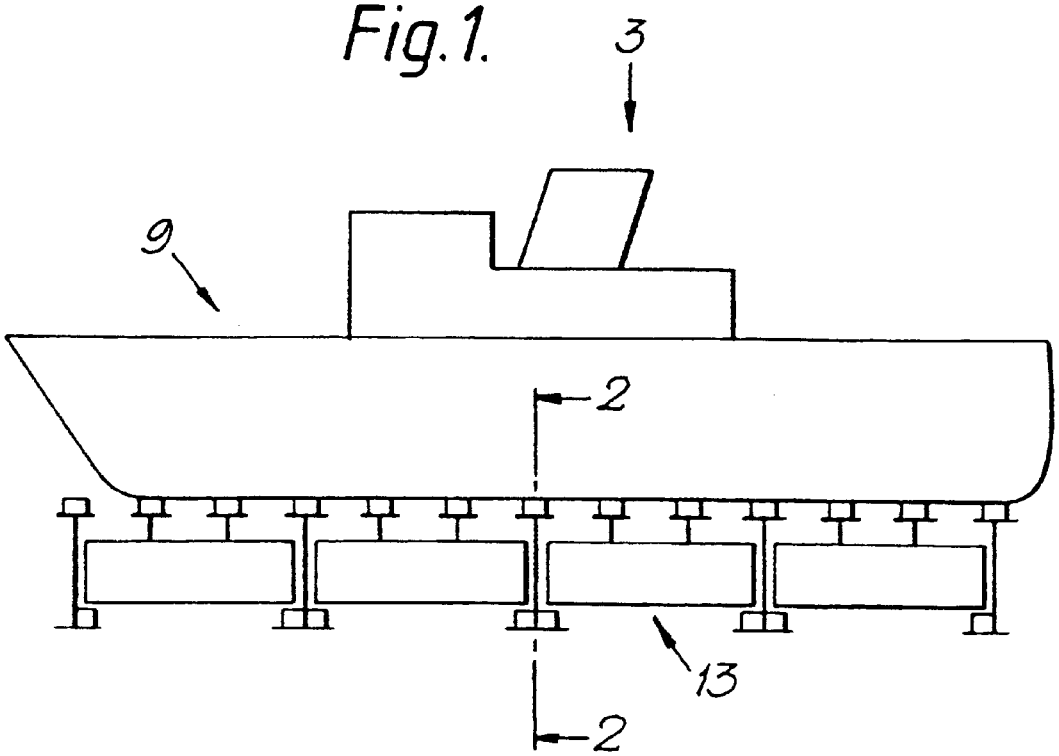
FIG. 1 is a diagrammatic side elevation of a dry dock incorporating the present invention.

Referring to FIG. 1. A platform 13 of the kind described in U.S. Pat. No. 4,087,979 supports a ship 9 for vertical movement with respect to a quay 10 (FIG. 2).

Figure 2:
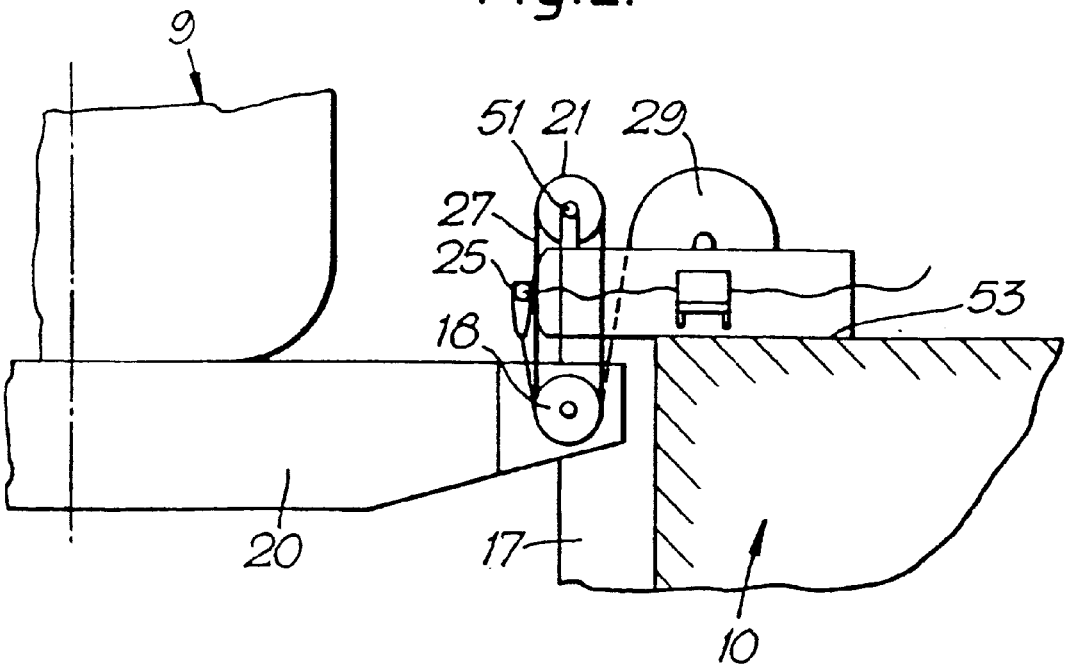
FIG. 2 is a diagrammatic view on line 2—2 of FIG. 1.

Referring now to FIG. 2. The platform 13 includes main transverse beams 20 the ends of which lie within cutouts 17 in the opposing faces of the quays 10 (FIG. 1) and 12 (FIG. 4).

The ends of the beams 20 carry sheaves 18.

Figure 4:
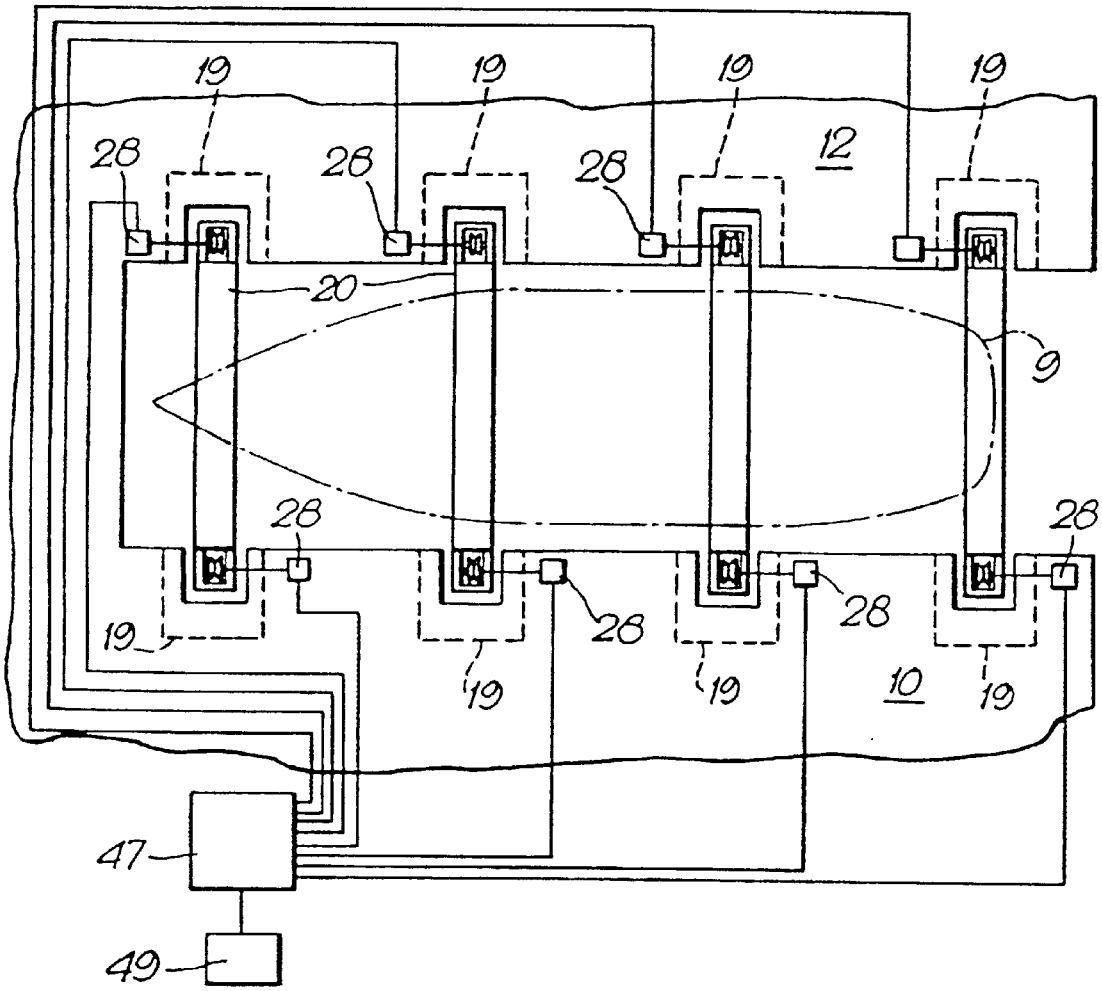
FIG. 4 is a view in the direction of arrow 4 in FIG. 1.

A hoist winch 19, one of a series of opposed pairs of hoist winches 19 as seen in in FIG. 4, is fixed to the quay and supports further sheaves 21 in approximately vertical alignment with the sheaves 18, and further includes a winch drum 29.

A wire rope 27 is fixed by one end to a load cell 25 which also doubles as a clevis pin and is fixed to the end of the structure of the hoist winch 19.

The rope 27 is wrapped around the sheaves 18 and 21, the remaining end finally leaving sheaves 18 and turning around the winch drum 29. A signal conditioning circuit 28 is fixed to or near the hoist winch structure 19 and is connected to the load cell clevis pin 25.

Figure 3:
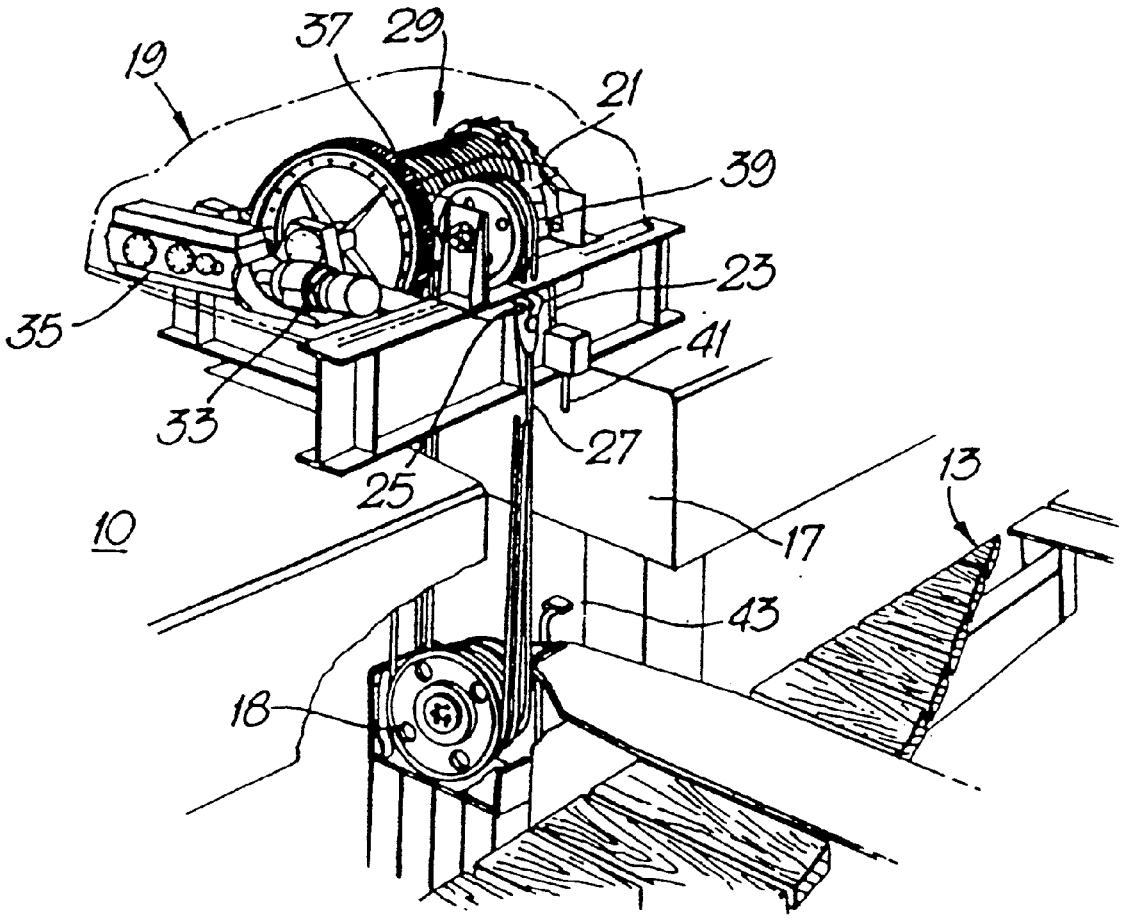
FIG. 3 is a pictorial view of a hoist winch of the kind utilised in the practising of the present invention.

Referring now to FIG. 3. Each winch drum 29 is driven by an a.c. synchronous motor 33 via a step down gear arrangement 35 and a toothed wheel 37 on the end of the drum 29.

A limit switch 41 is fastened to the structure of the hoist winch 19 and a contact pad 43 is carried by the beam 20. The limit switch is pre-set and when the platform 13 rises to its desired height during operation, the pad 43 contacts the limit switch 41 which then is actuated to effect halting of the platform 20.

Devices (not shown) within the system are utilised to determine the maximum desired lowered positions of the platform 13.

Figure 5:
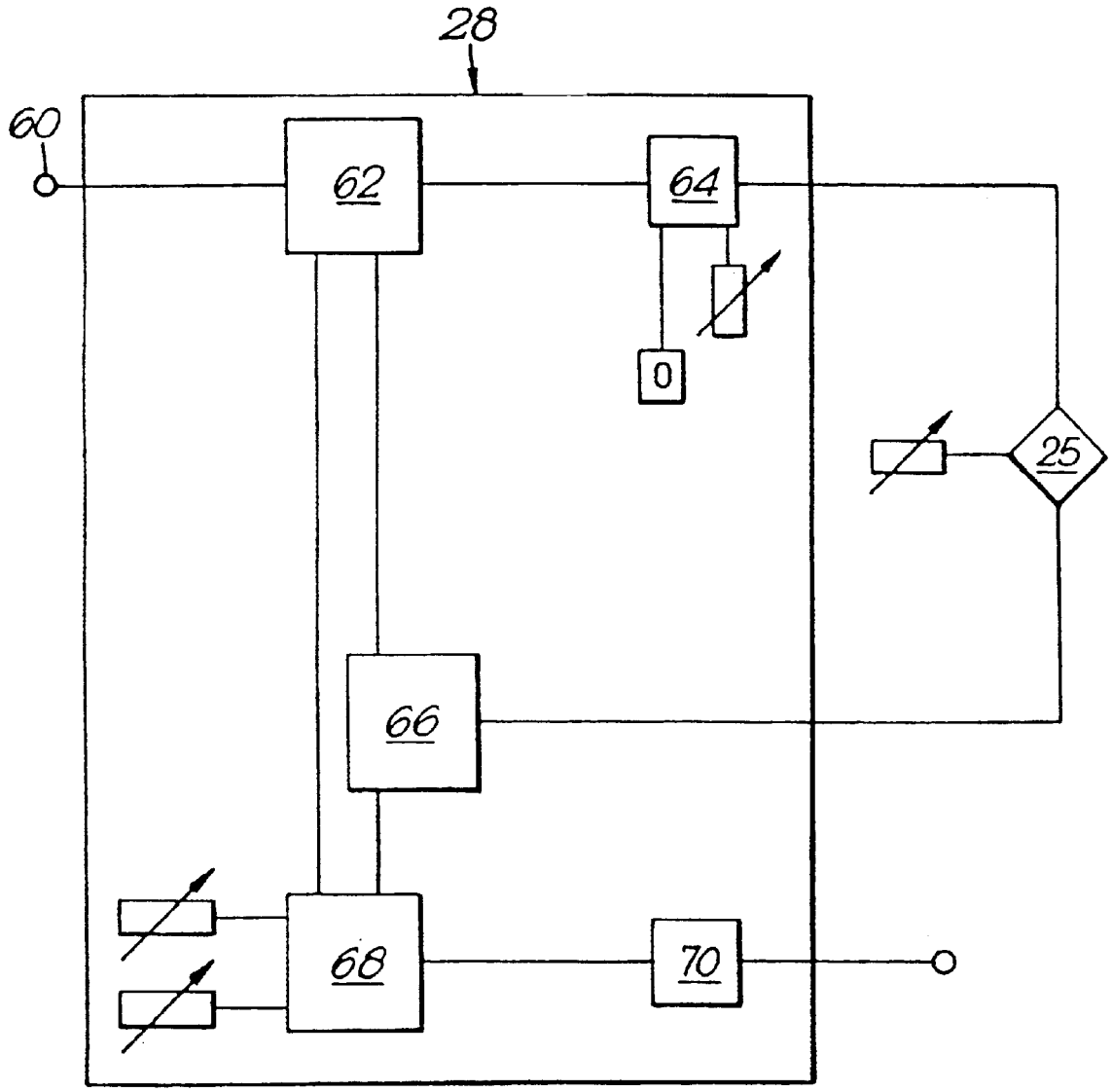
FIG. 5 is a schematic diagram of a signal conditioning circuit incorporated in the apparatus used in practising the modes of operation of the present invention.

Referring now to FIG. 4. During operation of the hoist winches 19 to raise or lower the platform 13 and its associated ship 9, the conditioning circuit 28 receives electrical signals from the load cell 25 associated with that winch 19. The circuit 28 which in FIG. 4 is depicted by a box, is more explicitly illustrated in FIG. 5 to which brief reference is now made. A d.c. input 60 is converted at 62 into a sinewave plus and minus d.c. voltage. The output from 62 is regulated at 64 and the resulting regulated, d.c. excitation voltage is passed to the load cell 25.

The output voltage from the load cell 25 is amplified at 66 and then converted at 68 to a current output for use in the computer, to which it is passed via a power handling MOSFET transducer 70.

Referring back to FIG. 4. The computer 47 sends control signals to the ship lift control panel which can stop or allow operation of the hoist winches 19, and sends further signals to a visual display unit 49 so as to display information which has been derived from the signals concerning the operating performance of the hoist winches 19, e.g. the loads being sensed, and also the current being drawn by the winch motor 33, the weight of the vessel being lifted/lowered and other characteristics of the system. Examples of information the visual display of which is enabled by the invention, are depicted in FIGS. 6 to 8 referred to hereinafter.

Figure 6:
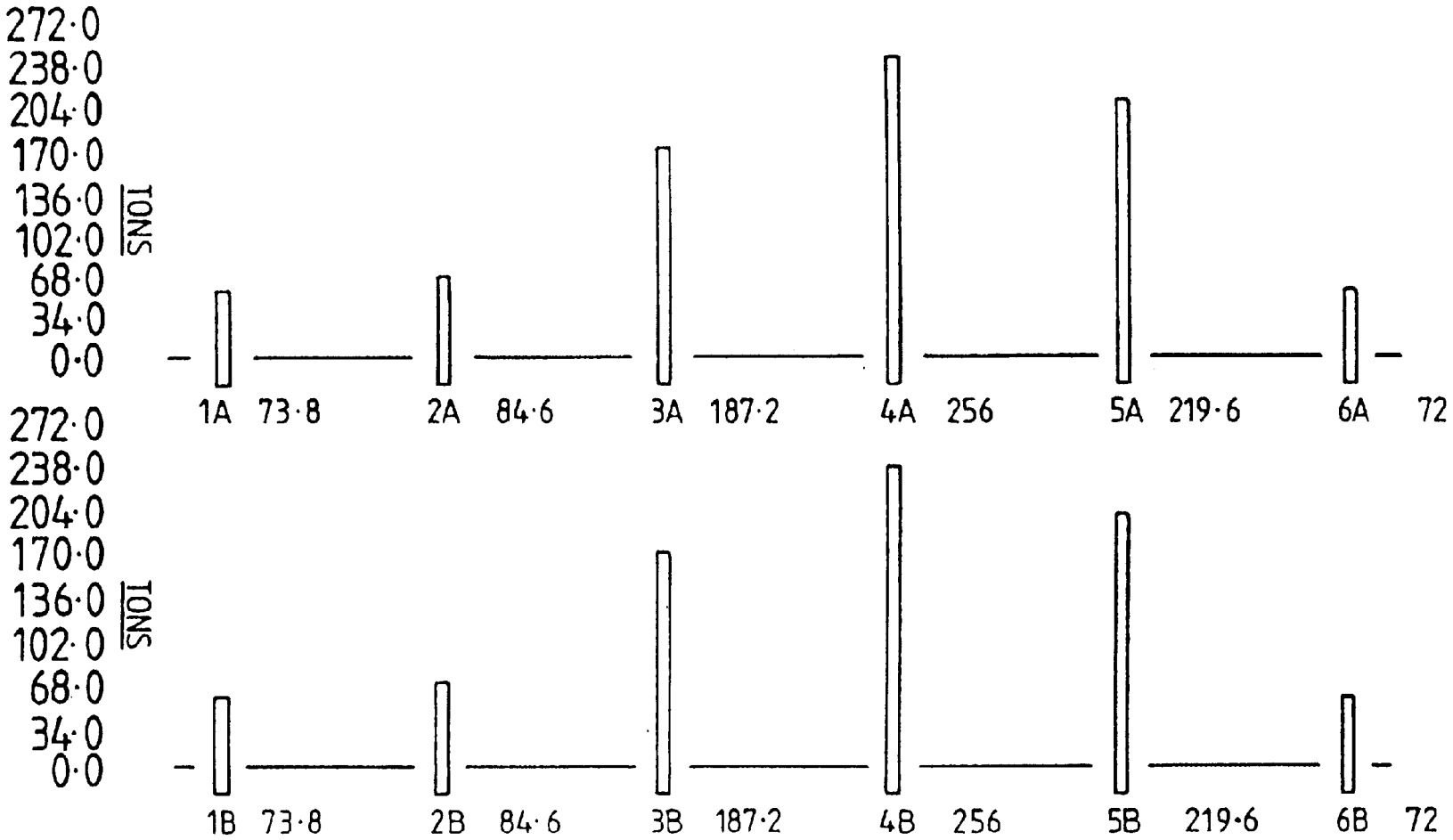
FIG. 6 is a dual graphic and actual numerical value display of a ships weight distribution in a hoist winch system incorporating six pairs of opposed winches of the kind depicted in FIG. 3.

FIG. 6 displays in both histogram and numerical form, the manner in which a particular ship's weight is distributed over the hoist winches 19. Opposed winch stations 1A and 1B are each experiencing a load of 73.8 tons. Stations 4A and 4B are each experiencing a load of 256 tons and stations 6A and 6B are each experiencing a load of 72 tons.

It should be noted, that the weights indicated from zero upwards relate to the ship. The projections of the histogram below the zero line are identical in extent, and correspond to the constant weight of the platform.

Clearly, the ability of the present invention to precisely ascertain a ship's weight distribution, also provides the ability to calculate the ships centre of gravity with a magnitude of accuracy over and above methods used presently and which by comparison are virtually emperical in both manner and result.

The foregoing description discloses the use of a load cell 25 in the form of a clevis pin. However, other forms of load cell may be used, and positioned anywhere in the load path of the loads which the hoist winches 19 experience during operation. Thus, by way of example, load cells can be positioned on the support structure 51 of the hoist winch sheaves 21, or at 53 between the hoist winches 19 and the quays 10 and 12, or at the clevis pin supports i.e. use a normal clevis pin 25 and support it on a load cell of appropriately adapted shape. Thus a computer programme is devised which, when the signals 45 from the load cells 25 reach the computer 47 (FIG. 4), will combine those inputs, (which represent the load experienced by each hoist winch 19) with the numerical value of the spacing between winches 19, both laterally and longitudinally of the platform, and from the moment arms thus produced, calculate the actual centre of gravity of the ship.

Where the ship being handled is new and unlaunched, the information as to the location of the ships centre of gravity is passed to the naval architect, for consideration whether it is sufficiently near to the designed location,. or that modifications should be incorporated, both in the design and the actual ship.

If the ship is docked for refurbishment, the employment of the method described herein, enables he total weight of the ship, and its distribution, to be observed during any structural alterations or repairs, and the effect, if any, such work has on the ships centre of gravity. All observations and calculations derived therefrom, are transmitted via a line from the computer or other means, to the yard manager or naval architect, as appropriate, for action to counter any undesirable effects.

A further advantage obtained by the practising of the method of the present invention, is that on dry docking a ship which is allegedly in light (empty) condition, observance of any excessive weight, of a magnitude greater than the norm, and, particularly, a centre of gravity far removed from the design location for the particular ship, is a clear indication that one or more holds still contain cargo. This would provide a safety feature where the ship is a warship, and the cargo comprises ammunition, in that an opportunity is afforded to remove the ammunition prior to starting work on the ship.

Where the ship is a cargo ship, the excessive weight would apply undesirable local forces on the ships hull, bearng in mind that the ship is no longer supported in water. The information, on being passed to the yard manager, can be quickly acted on upon as appropriate.

We claim:

[1. A method of determining and analyzing a ship's weight characteristics and the distnbution of loads, the magnitude of which are not accurately known and which are generated between a ship and a supporting dry dock, comprising the steps of:

a) placing the ship on a dry dock comprising a number of articulatedly joined platforms, with each said platform being suspended from a number of opposed pairs. of hoist winches comprising apparatus which includes means for signalling the loads experienced by each one of said hoist winches, means for displaying said loads in accordance with said signals and means for controlling said hoist winches in accordance with said signals;

b) observing said loads on said display means, electronically summing them to achieve the total weight of the ship and utilizing the results by way of comparing them with the designed weight of the ship so as to enable assessment of need for design changes.]

2. A method of determining and analyzing a [ships] *ship's* weight characteristics comprising the steps of a) placing the ship on a dry dock comprising a number of articulatedly joined platforms, the whole being suspended from a number of opposed pairs of hoist winches and with said hoist winches comprising apparatus which includes means for signalling the load experienced by each hoist winch, means for displaying said loads in accordance with said signals and means for controlling said hoist winches in accordance with said signals, b) observing the loads being experienced by said hoist winches, and combining the numerical values of said loads and the distances between hoist winches so as to enable computation of the ships actual center of gravity[;], c) performing said computation and comparing the result with the design predicted center of gravity of the ship for the purpose of assessing the necessity for design changes.

3. A method of determining and analyzing a [ships] *ship's* weight characteristics comprising the steps of a) placing the ship on a dry dock comprising a number of articulatedly joined platforms, the whole being suspended from a number of opposed pairs of hoist winches and with said hoist winches comprises apparatus including means for signalling the loads experienced by said hoist winches, means for displaying said loads in accordance with said signals and control means for controlling said hoist winches in accordance with said signals, b) observing on said display means the loads experienced by the hoist winches and noting if and where there exists local loads of a magnitude which are large relative to the norm for said locality in said ship when empty and, c) where such loads exist, inspecting the holds in that or those localities and if cargo is present, unloading it prior to commencing other work on the ship.

* * * * *